(12) United States Patent
Vontorcik, Jr. et al.

(10) Patent No.: US 10,647,808 B2
(45) Date of Patent: May 12, 2020

(54) METHODS OF USING THERMOPLASTIC POLYURETHANES IN SELECTIVE LASER SINTERING AND SYSTEMS AND ARTICLES THEREOF

(71) Applicant: Lubrizol Advanced Materials, Inc., Cleveland, OH (US)

(72) Inventors: Joseph J. Vontorcik, Jr., Broadview Heights, OH (US); Geert Vermunicht, Houtvenne (BE); Edward W. Ault, Grafton, OH (US); An Plessers, Mol (BE)

(73) Assignee: Lubrizol Advanced Materials, Inc., Wickliffe, OH (US)

( * ) Notice: Subject to any disclaimer, the term of this patent is extended or adjusted under 35 U.S.C. 154(b) by 196 days.

(21) Appl. No.: 15/118,989

(22) PCT Filed: Jan. 16, 2015

(86) PCT No.: PCT/US2015/011693
§ 371 (c)(1),
(2) Date: Aug. 15, 2016

(87) PCT Pub. No.: WO2015/109143
PCT Pub. Date: Jul. 23, 2015

(65) Prior Publication Data
US 2017/0008233 A1    Jan. 12, 2017

Related U.S. Application Data

(60) Provisional application No. 61/928,430, filed on Jan. 17, 2014.

(51) Int. Cl.
| | | |
|---|---|---|
| *B29C 67/00* | (2017.01) |
| *C08G 18/48* | (2006.01) |
| *B33Y 70/00* | (2020.01) |
| *B33Y 10/00* | (2015.01) |
| *B29C 64/153* | (2017.01) |
| *C08L 75/08* | (2006.01) |
| *C08L 75/06* | (2006.01) |
| *B33Y 30/00* | (2015.01) |
| *B33Y 80/00* | (2015.01) |
| *C08G 18/42* | (2006.01) |
| *B29K 75/00* | (2006.01) |
| *B29K 105/00* | (2006.01) |
| *B29L 31/00* | (2006.01) |

(52) U.S. Cl.
CPC ............ *C08G 18/48* (2013.01); *B29C 64/153* (2017.08); *B33Y 10/00* (2014.12); *B33Y 30/00* (2014.12); *B33Y 70/00* (2014.12); *B33Y 80/00* (2014.12); *C08G 18/42* (2013.01); *C08G 18/4277* (2013.01); *C08L 75/06* (2013.01); *C08L 75/08* (2013.01); *B29K 2075/00* (2013.01); *B29K 2105/251* (2013.01); *B29K 2995/0012* (2013.01); *B29L 2031/753* (2013.01)

(58) Field of Classification Search
CPC ...... B29C 64/10; B29C 64/141; B29C 64/188
See application file for complete search history.

(56) References Cited

U.S. PATENT DOCUMENTS

| | | | |
|---|---|---|---|
| 6,110,411 A | 8/2000 | Clausen et al. | |
| 8,114,334 B2 | 2/2012 | Martinoni et al. | |
| 8,697,830 B2 | 4/2014 | Peerlings et al. | |
| 2003/0060574 A1* | 3/2003 | Muller ............... | C08G 18/0895 525/457 |

FOREIGN PATENT DOCUMENTS

| | | | | |
|---|---|---|---|---|
| CN | 103160948 | | 6/2013 | |
| DE | 10120567 | A1 | 11/2002 | |
| DE | 10122492 | A1 | 11/2002 | |
| DE | 102010062875 | A1 * | 6/2012 | ........... B29C 64/153 |
| WO | 2010131275 | A1 | 11/2010 | |

OTHER PUBLICATIONS

International Search Report, dated Jul. 9, 2015, for PCT/US15/011693, issued by the European Patent Office.
Written Opinion, dated Jul. 9, 2015, for PCT/US15/011693, issued by the European Patent Office.

* cited by examiner

*Primary Examiner* — James Sanders
(74) *Attorney, Agent, or Firm* — Eryn Ace Fuhrer; Teresan W. Gilbert

(57) ABSTRACT

The present invention relates to systems and methods for solid freeform fabrication, especially selective laser sintering, as well as various articles made using the same, where the systems and methods utilize certain thermoplastic polyurethanes which are particularly suited for such processing. The useful thermoplastic polyurethanes are derived from (a) a polyisocyanate component, (b) a polyol component, and (c) an optional chain extender component; wherein the resulting thermoplastic polyurethane has a melting enthalpy of at least 5.5 J/g, a Tc (crystallization temperature) of more than 70° C., a Δ(Tm:Tc) of from 20 to 75 degrees, where Δ(Tm:Tc) is the difference between the Tm (melting temperature) and Tc.

11 Claims, No Drawings

METHODS OF USING THERMOPLASTIC POLYURETHANES IN SELECTIVE LASER SINTERING AND SYSTEMS AND ARTICLES THEREOF

CROSS REFERENCE TO RELATED APPLICATION

This application claims priority from PCT Application Serial No. PCT/US2015/011693 filed on Jan. 16, 2015, which claims the benefit of U.S. Provisional Application No. 61/928,430 filed on Jan. 17, 2014, the entirety of both of which are hereby incorporated by reference.

FIELD OF THE INVENTION

The present invention relates to systems and methods for solid freeform fabrication, especially selective laser sintering, as well as various articles made using the same, where the systems and methods utilize certain thermoplastic polyurethanes which are particularly suited for such processing. The useful thermoplastic polyurethanes are derived from (a) a polyisocyanate component, (b) a polyol component, and (c) an optional chain extender component; wherein the resulting thermoplastic polyurethane has a melting enthalpy of at least 5.5 J/g, a Tc (crystallization temperature) of more than 70° C., a Δ(Tm:Tc) of from 20 to 75 degrees, where Δ(Tm:Tc) is the difference between the Tm (melting temperature) and Tc.

BACKGROUND

The present invention relates to solid freeform fabrication and, more particularly, selective laser sintering, using certain thermoplastic polyurethanes.

Solid Freeform Fabrication (SFF) is a technology enabling fabrication of arbitrarily shaped structures directly from computer data via additive formation steps. The basic operation of any SFF system consists of slicing a three-dimensional computer model into thin cross sections, translating the result into two-dimensional position data and feeding the data to control equipment which fabricates a three-dimensional structure in a layer-wise manner.

Solid freeform fabrication entails many different approaches to the method of fabrication, including three-dimensional printing, electron beam melting, stereolithography, selective laser sintering, laminated object manufacturing, fused deposition modeling and others.

In three-dimensional printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built.

Solid freeform fabrication is typically used in design-related fields where it is used for visualization, demonstration and mechanical prototyping. Thus, SFF facilitates rapid fabrication of functioning prototypes with minimal investment in tooling and labor. Such rapid prototyping shortens the product development cycle and improves the design process by providing rapid and effective feedback to the designer. SFF can also be used for rapid fabrication of non-functional parts, e.g., for the purpose of assessing various aspects of a design such as aesthetics, fit, assembly and the like. Additionally, SFF techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

There is growing interest in this form of fabrication. Many materials have been considered for use in such systems and methods using the same, however, thermoplastic polyurethanes have proven difficult to utilize in these systems and methods. This is due at least in part to the difficulty in processing the TPU into the proper particle size distribution and making sure the physical properties of the TPU are well suited for selective laser sintering processing. The low crystallization rate of TPU can also make it difficult to maintain tolerances when laying down the melt stream onto the parts being built. Further, the broad melt range for TPU materials can make viscosity control somewhat challenging and there may be fuming or off gassing issues with using many TPU materials.

Given the attractive combination of properties thermoplastic polyurethanes may offer, and the wide variety of articles made using more conventional means of fabrication, there is a growing need to identify and/or develop thermoplastic polyurethanes well suited for solid freeform fabrication, and particularly selective laser sintering.

SUMMARY

The disclosed technology provides a system for fabricating a three-dimensional object, comprising a solid freeform fabrication apparatus that selectively fuses layers of powder; wherein said powder comprises a thermoplastic polyurethane derived from (a) a polyisocyanate component, (b) a polyol component, and (c) an optional chain extender component; wherein said powder has an average particle diameter of less than 200 microns (or even less than 150 or less than 100 microns and in some embodiments at least 50 or even 100 microns); wherein the resulting thermoplastic polyurethane has a melting enthalpy (as measured by DSC) of at least 5.5 J/g (or even at least 10 or at least 15 J/g, and in some embodiments less than 100, 50, or even 45 J/g); wherein the resulting thermoplastic polyurethane has a Tc (crystallization temperature measured by DSC) of at least than 70° C., (or even greater than 80° C. or greater than 90° C., and in some embodiments less than 150, 140, or even less than 130° C.); and wherein the resulting thermoplastic polyurethane has a Δ(Tm:Tc), (the difference between the Tm and Tc of the thermoplastic polyurethane where both are measured by DSC), of between 20 and 75 degrees (or a difference of at least 20, 30, 40, 50, or even 58 degrees and no more than 75, 71, or even 60 degrees).

The disclosed technology provides a method of fabricating a three-dimensional object, comprising the step of: (I) operating a system for producing a three-dimensional object from a powder; wherein said system comprises a solid freeform fabrication apparatus that selectively fuses layers of powder; so as to form the three-dimensional object; wherein said powder comprises a thermoplastic polyurethane derived from (a) a polyisocyanate component, (b) a polyol component, and (c) an optional chain extender component; wherein said powder has an average particle diameter of less than 200 microns (or even less than 150 or less than 100 microns and in some embodiments at least 50 or even 100 microns); wherein the resulting thermoplastic polyurethane has a melting enthalpy (as measured by DSC) of at least 5.5 J/g (or even at least 10 or at least 15 J/g, and in some embodiments less than 100, 50, or even 45 J/g); wherein the resulting thermoplastic polyurethane has a Tc (crystallization temperature measured by DSC) of at least than 70° C., (or even greater than 80° C. or greater than 90° C., and in some embodiments less than 150, 140, or even less than 130° C.); and wherein the resulting thermoplastic polyurethane has a Δ(Tm:Tc), (the difference between the Tm and Tc of the thermoplastic polyurethane where both are measured by DSC), of between 20 and 75 degrees (or a difference of at least 20, 30, 40, 50, or even 58 degrees and no more than 75, 71, or even 60 degrees).

The disclosed technology provides an article of manufacturing, fabricated by a solid freeform fabrication apparatus that selectively fuses layers of powder; wherein said powder has an average particle diameter of less than 200 microns (or even less than 150 or less than 100 microns and in some embodiments at least 50 or even 100 microns); wherein the resulting thermoplastic polyurethane has a melting enthalpy (as measured by DSC) of at least 5.5 J/g (or even at least 10 or at least 15 J/g, and in some embodiments less than 100, 50, or even 45 J/g); wherein the resulting thermoplastic polyurethane has a Tc (crystallization temperature measured by DSC) of at least than 70° C., (or even greater than 80° C. or greater than 90° C., and in some embodiments less than 150, 140, or even less than 130° C.); and wherein the resulting thermoplastic polyurethane has a Δ(Tm:Tc), (the difference between the Tm and Tc of the thermoplastic polyurethane where both are measured by DSC), of between 20 and 75 degrees (or a difference of at least 20, 30, 40, 50, or even 58 degrees and no more than 75, 71, or even 60 degrees).

The disclosed technology provides any of the systems, methods and/or articles described herein, wherein the solid freeform fabrication apparatus comprises: (a) a chamber having a target area at which an additive process is performed; (b) means for depositing and leveling a layer of powder on said target area; and (c) means for fusing selected portions of a layer of the powder at said target area.

The disclosed technology provides any of the systems, methods and/or articles described herein, wherein said solid freeform fabrication apparatus comprises a selective laser sintering apparatus.

The disclosed technology provides any of the systems, methods and/or articles described herein, wherein the polyisocyanate component comprises an aromatic diisocyanate.

The disclosed technology provides any of the systems, methods and/or articles described herein, wherein the polyisocyanate component comprises 4,4'-methylenebis(phenyl isocyanate).

The disclosed technology provides any of the systems, methods and/or articles described herein, wherein the polyol component comprises a polyether polyol, a polyester polyol, a copolymer of polyether and polyester polyols, or a combination thereof.

The disclosed technology provides any of the systems, methods and/or articles described herein, wherein the polyol component comprises poly(tetramethylene ether glycol), polycaprolactone, a polyester adipate, a copolymer thereof, or a combination thereof.

The disclosed technology provides any of the systems, methods and/or articles described herein, wherein the chain extender component comprises a linear alkylene diol.

The disclosed technology provides any of the systems, methods and/or articles described herein, wherein the chain extender component comprises 1,4-butanediol, 1,12-dodecanediol, dipropylene glycol, or a combination thereof.

The disclosed technology provides any of the systems, methods and/or articles described herein, wherein the thermoplastic polyurethane further comprises one or more colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents, or any combinations thereof.

The disclosed technology provides any of the systems, methods and/or articles described herein, wherein said article comprises cook and storage ware, furniture, automotive components, toys, sportswear, medical devices, personalized medical articles, replicated medical implants, dental articles, sterilization containers, drapes, gowns, filters, hygiene products, diapers, films, sheets, tubes, pipes, wire jacketing, cable jacketing, agricultural films, geomembranes, sporting equipment, cast film, blown film, profiles, boat and water craft components, crates, containers, packaging, labware, office floor mats, instrumentation sample holders, liquid storage containers, packaging material, medical tubing and valves, a footwear component, a sheet, a tape, a carpet, an adhesive, a wire sheath, a cable, a protective apparel, an automotive part, a coating, a foam laminate, an overmolded article, an automotive skin, an awning, a tarp, a leather article, a roofing construction article, a steering wheel, a powder coating, a powder slush molding, a consumer durable, a grip, a handle, a hose, a hose liner, a pipe, a pipe liner, a caster wheel, a skate wheel, a computer component, a belt, an applique, a footwear component, a conveyor or timing belt, a glove, a fiber, a fabric, or a garment.

The disclosed technology provides any of the systems, methods and/or articles described herein, wherein the resulting thermoplastic polyurethane has a Tm (melting temperature as measured by DSC) of at least 120° C. (or even greater than 130, 140, 170 or 175° C. and in some embodiments less than 200, 190, or even 180° C.).

The disclosed technology provides any of the systems, methods and/or articles described herein, wherein the resulting thermoplastic polyurethane has a weight average molecular weight, Mw, (measured by GPC) of less than 150,000 (or even less than 140,000, 120,000, or less than 100,000, and in some embodiments more than 30,000, 40,00, 50,000, 60,000, or even more than 70,000).

The disclosed technology provides any of the systems, methods and/or articles described herein, wherein the resulting thermoplastic polyurethane has a Mw/Mn ratio (where Mw is the weight average molecular weight and Mn is the number average molecular weight, where both are measured by GPC) of less than 2.7 (or even less than 2.6, less than 2.5, or less than 2.0, and in some embodiments at least 1.0, more than 1.0, more than 1.5, 1.7, or even more than 1.8).

DETAILED DESCRIPTION

Various preferred features and embodiments will be described below by way of non-limiting illustration.

The disclosed technology provides systems for solid freeform fabrication of a three-dimensional objects and/or articles. Also provided are methods of using such systems and articles made using such systems and/or methods. The disclosed technology provides these systems, methods, and articles where certain thermoplastic polyurethanes are used, more specifically thermoplastic polyurethanes derived from (a) a polyisocyanate component, (b) a polyol component, and (c) an optional chain extender component; wherein said powder has an average particle diameter of less than 200 microns (or even less than 150 or less than 100 microns and in some embodiments at least 50 or even 100 microns); wherein the resulting thermoplastic polyurethane has a melting enthalpy (as measured by DSC) of at least 5.5 J/g (or even at least 10 or at least 15 J/g, and in some embodiments less than 100, 50, or even 45 J/g); wherein the resulting thermoplastic polyurethane has a Tc (crystallization temperature measured by DSC) of at least than 70° C., (or even greater than 80° C. or greater than 90° C., and in some embodiments less than 150, 140, or even less than 130° C.); and wherein the resulting thermoplastic polyurethane has a Δ(Tm:Tc), (the difference between the Tm and Tc of the thermoplastic polyurethane where both are measured by DSC), of between 20 and 75 degrees (or a difference of at least 20, 30, 40, 50, or even 58 degrees and no more than 75, 71, or even 60 degrees). In some of these embodiments, the thermoplastic polyurethane further has (i) a Tm (melting temperature as measured by DSC) of at least 120° C. (or even greater than 130, 140, 170 or 175° C. and in some embodiments less than 200, 190, or even 180° C.), (ii) a weight average molecular weight, Mw, (measured by GPC) of less than 150,000 (or even less than 120,000, or less than 100,000, and in some embodiments more than 30,000, 40,00, 50,000, 60,000, or even more than 70,000), and/or (iii) a Mw/Mn ratio (where Mw is the weight average molecular weight and Mn is the number average molecular weight, where both are measured by GPC) of less than 2.7 (or even less than 2.6, less than 2.5, or less than 2.0, and in some embodiments at least 1.0, more than 1.0, more than 1.5, 1.7, or even more than 1.8).

The Thermoplastic Polyurethanes.

The thermoplastic polyurethanes useful in the described technology are derived from (a) a polyisocyanate component, (b) a polyol component, and (c) an optional chain extender component; wherein the resulting thermoplastic polyurethane meets the parameters described above.

The TPU compositions described herein are made using (a) a polyisocyanate component. The polyisocyanate and/or polyisocyanate component includes one or more polyisocyanates. In some embodiments, the polyisocyanate component includes one or more diisocyanates.

In some embodiments, the polyisocyanate and/or polyisocyanate component includes an alpha, omega-alkylene diisocyanate having from 5 to 20 carbon atoms.

Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aliphatic diisocyanates. In some embodiments, the polyisocyanate component is essentially free of, or even completely free of, aromatic diisocyanates.

Examples of useful polyisocyanates include aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), 3,3'-dimethyl-4,4'-biphenylene diisocyanate (TODI), 1,5-naphthalene diisocyanate (NDI), and dicyclohexylmethane-4,4'-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate includes H12MDI.

In some embodiments, the thermoplastic polyurethane is prepared with a polyisocyanate component that includes H12MDI. In some embodiments, the thermoplastic polyurethane is prepared with a polyisocyanate component that consists essentially of H12MDI. In some embodiments, the thermoplastic polyurethane is prepared with a polyisocyanate component that consists of H12MDI.

In some embodiments, the thermoplastic polyurethane is prepared with a polyisocyanate component that includes (or consists essentially of, or even consists of) H12MDI and at least one of MDI, HDI, TDI, IPDI, LDI, BDI, PDI, CHDI, TODI, and NDI.

In some embodiments, the polyisocyanate used to prepare the TPU and/or TPU compositions described herein is at least 50%, on a weight basis, a cycloaliphatic diisocyanate. In some embodiments, the polyisocyanate includes an alpha, omega-alkylene diisocyanate having from 5 to 20 carbon atoms.

In some embodiments, the polyisocyanate used to prepare the TPU and/or TPU compositions described herein includes hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, or combinations thereof.

In some embodiments, the polyisocyanate component comprises an aromatic diisocyanate. In some embodiments, the polyisocyanate component comprises 4,4'-methylenebis (phenyl isocyanate).

The TPU compositions described herein are made using (b) a polyol component. Polyols include polyether polyols, polyester polyols, polycarbonate polyols, polysiloxane polyols, and combinations thereof.

Suitable polyols, which may also be described as hydroxyl terminated intermediates, when present, may include one or more hydroxyl terminated polyesters, one or more hydroxyl terminated polyethers, one or more hydroxyl terminated polycarbonates, one or more hydroxyl terminated polysiloxanes, or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

The polyol component may also include one or more polycaprolactone polyester polyols. The polycaprolactone polyester polyols useful in the technology described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycols and/or diols listed herein. In some embodiments, the polycaprolactone polyester polyols are linear polyester diols derived from caprolactone monomers.

Useful examples include CAPA™ 2202A, a 2000 number average molecular weight (Mn) linear polyester diol, and CAPA™ 2302A, a 3000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyester polyol is linear. In some embodiments, the polycaprolactone polyester polyol is prepared from 1,4-butanediol. In some embodiments, the polycaprolactone polyester polyol has a number average molecular weight from 500 to 10,000, or from 500 to 5,000, or from 1,000 or even 2,000 to 4,000 or even 3000.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as POLYTHF® B block copolymer and POLYTHF® R random copolymer. The various polyether intermediates generally have a number average molecular weight (Mn) as determined by assay of the terminal functional groups which is an average molecular weight greater than about 700, such as from about 700 to about 10,000, from about 1,000 to about 5,000, or from about 1,000 to about 2,500. In some embodiments, the polyether intermediate includes a blend of two or more different molecular weight polyethers, such as a blend of 2,000 Mn and 1000 Mn PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 2,2,4-trimethyl-1,6-hexanediol, 1,10-decanediol, hydrogenated dilinoleylglycol, hydrogenated dioleylglycol, 3-methyl-1,5-pentanediol; and cycloaliphatic diols such as 1,3-cyclohexanediol, 1,4-dimethylolcyclohexane, 1,4-cyclohexanediol-, 1,3-dimethylolcyclohexane-, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenyl carbonate, ditolylcarbonate, and dinaphthylcarbonate.

Suitable polysiloxane polyols include alpha-omega-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

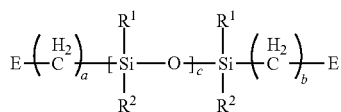

in which: each $R^1$ and $R^2$ are independently a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Suitable examples include alpha-omega-hydroxypropyl terminated poly(dimethysiloxane) and alpha-omega-aminopropyl terminated poly(dimethysiloxane), both of which are commercially available materials. Further examples include copolymers of the poly(dimethysiloxane) materials with a poly(alkylene oxide).

The polyol component, when present, may include poly(ethylene glycol), poly(tetramethylene ether glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1,5-pentamethylene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, or any combination thereof.

Examples of dimer fatty acids that may be used to prepare suitable polyester polyols include PRIPLAST™ polyester glycols/polyols commercially available from Croda and RADIA® polyester glycols commercially available from Oleon.

In some embodiments, the polyol component includes a polyether polyol, a polycarbonate polyol, a polycaprolactone polyol, or any combination thereof.

In some embodiments, the polyol component includes a polyether polyol. In some embodiments, the polyol component is essentially free of or even completely free of polyester polyols. In some embodiments, the polyol component used to prepare the TPU is substantially free of, or even completely free of polysiloxanes.

In some embodiments, the polyol component includes ethylene oxide, propylene oxide, butylene oxide, styrene oxide, poly(tetramethylene ether glycol), poly(propylene glycol), poly(ethylene glycol), copolymers of poly(ethylene glycol) and poly(propylene glycol), epichlorohydrin, and the like, or combinations thereof. In some embodiments, the polyol component includes poly(tetramethylene ether glycol).

In some embodiments the polyol has a number average molecular weight of at least 900. In other embodiments the polyol has a number average molecular weight of at least 900, 1,000, 1,500, 1,750, and/or a number average molecular weight up to 5,000, 4,000, 3,000, 2,500, or even 2,000.

In some embodiments, the polyol component comprises a polycaprolactone polyester polyether polyol, a polyether polyol, a polycaprolactone polyester polyether copolymer polyol, a polyester polyol, or any combination thereof.

In some embodiments, the polyol component comprises a polycaprolactone polyester polyether polyol, a poly(tetramethylene ether glycol), a polycaprolactone polyester poly(tetramethylene ether glycol) copolymer polyol, a polybutylene adipate, a polybutylene-hexylene adipate (an adipate made from a mixture of 1,4-butanediol and 1,6-hexanediol), or any combination thereof. In some embodiments, the polyol component comprises a polycaprolactone polyester poly(tetramethylene ether glycol) copolymer polyol.

The TPU compositions described herein are made using c) a chain extender component. Chain extenders include diols, diamines, and combination thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl] propane (HEPP), hexamethylenediol, heptanediol, nonanediol, dodecanediol, 3-methyl-1,5-pentanediol, ethylenediamine, butanediamine, hexamethylenediamine, and hydroxyethyl resorcinol (HER), and the like, as well as mixtures thereof. In some embodiments, the chain extender includes BDO, HDO, 3-methyl-1,5-pentanediol, or a combination thereof. In some embodiments, the chain extender includes BDO. Other glycols, such as aromatic glycols could be used, but in some embodiments the TPUs described herein are essentially free of or even completely free of such materials.

In some embodiments, the chain extender used to prepare the TPU is substantially free of, or even completely free of, 1,6-hexanediol. In some embodiments, the chain extender used to prepare the TPU includes a cyclic chain extender. Suitable examples include CHDM, HEPP, HER, and combinations thereof. In some embodiments, the chain extender used to prepare the TPU includes an aromatic cyclic chain extender, for example, HEPP, HER, or a combination thereof. In some embodiments, the chain extender used to prepare the TPU includes an aliphatic cyclic chain extender, for example, CHDM. In some embodiments, the chain extender used to prepare the TPU is substantially free of, or even completely free of aromatic chain extenders, for example, aromatic cyclic chain extenders. In some embodiments, the chain extender used to prepare the TPU is substantially free of, or even completely free of polysiloxanes.

In some embodiments, the chain extender component includes 1,4-butanediol, 2-ethyl-1,3-hexanediol, 2,2,4-trimethyl pentane-1,3-diol, 1,6-hexanediol, 1,4-cyclohexane dimethylol, 1,3-propanediol, 3-methyl-1,5-pentanediol or combinations thereof. In some embodiments, the chain extender component includes 1,4-butanediol, 3-methyl-1,5-pentanediol or combinations thereof. In some embodiments, the chain extender component includes 1,4-butanediol.

In some embodiments, the chain extender component comprises a linear alkylene diol. In some embodiments, the chain extender component comprises 1,4-butanediol, dipropylene glycol, or a combination of the two. In some embodiments, the chain extender component comprises 1,4-butanediol.

In some embodiments, the mole ratio of the chain extender to the polyol is greater than 1.5. In other embodiments, the mole ratio of the chain extender to the polyol is at least (or greater than) 1.5, 2.0, 3.5, 3.7, or even 3.8 and/or the mole ratio of the chain extender to the polyol may go up to 5.0, or even 4.0.

The thermoplastic polyurethanes described herein may also be considered to be thermoplastic polyurethane (TPU) compositions. In such embodiments, the compositions may contain one or more TPU. These TPU are prepared by reacting: a) the polyisocyanate component described above; b) the polyol component described above; and c) the chain extender component described above, where the reaction may be carried out in the presence of a catalyst. At least one of the TPU in the composition must meet the parameters described above making it suitable for solid freeform fabrication, and in particular fused deposition modeling.

The means by which the reaction is carried out is not overly limited, and includes both batch and continuous processing. In some embodiments, the technology deals with batch processing of aliphatic TPU. In some embodiments, the technology deals with continuous processing of aliphatic TPU.

The described compositions include the TPU materials described above and also TPU compositions that include such TPU materials and one or more additional components. These additional components include other polymeric materials that may be blended with the TPU described herein. These additional components include one or more additives that may be added to the TPU, or blend containing the TPU, to impact the properties of the composition.

The TPU described herein may also be blended with one or more other polymers. The polymers with which the TPU described herein may be blended are not overly limited. In some embodiments, the described compositions include two or more of the described TPU materials. In some embodiments, the compositions include at least one of the described TPU materials and at least one other polymer, which is not one of the described TPU materials.

Polymers that may be used in combination with the TPU materials described herein also include more conventional TPU materials such as non-caprolactone polyester-based TPU, polyether-based TPU, or TPU containing both non-caprolactone polyester and polyether groups. Other suitable materials that may be blended with the TPU materials described herein include polycarbonates, polyolefins, styrenic polymers, acrylic polymers, polyoxymethylene polymers, polyamides, polyphenylene oxides, polyphenylene sulfides, polyvinylchlorides, chlorinated polyvinyl chlorides, polylactic acids, or combinations thereof.

Polymers for use in the blends described herein include homopolymers and copolymers. Suitable examples include: (i) a polyolefin (PO), such as polyethylene (PE), polypropylene (PP), polybutene, ethylene propylene rubber (EPR), polyoxyethylene (POE), cyclic olefin copolymer (COC), or combinations thereof; (ii) a styrenic, such as polystyrene (PS), acrylonitrile butadiene styrene (ABS), styrene acrylonitrile (SAN), styrene butadiene rubber (SBR or HIPS), polyalphamethylstyrene, styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof; (iii) a thermoplastic polyurethane (TPU) other than those described above; (iv) a polyamide, such as Nylon™, including polyamide 6,6 (PA66), polyamide 1,1 (PA11), polyamide 1,2 (PA12), a copolyamide (COPA), or combinations thereof; (v) an acrylic polymer, such as polymethyl acrylate, polymethylmethacrylate, a methyl methacrylate styrene (MS) copolymer, or combinations thereof; (vi) a polyvinylchloride (PVC), a chlorinated polyvinylchloride (CPVC), or combinations thereof; (vii) a polyoxyemethylene, such as polyacetal; (viii) a polyester, such as polyethylene terephthalate (PET), polybutylene terephthalate (PBT), copolyesters and/or polyester elastomers (COPE) including polyetherester block copolymers such as glycol modified polyethylene terephthalate (PETG), polylactic acid (PLA), polyglycolic acid (PGA), copolymers of PLA and PGA, or combinations thereof; (ix) a polycarbonate (PC), a polyphenylene sulfide (PPS), a polyphenylene oxide (PPO), or combinations thereof; or combinations thereof.

In some embodiments, these blends include one or more additional polymeric materials selected from groups (i), (iii), (vii), (viii), or some combination thereof. In some embodiments, these blends include one or more additional polymeric materials selected from group (i). In some embodiments, these blends include one or more additional polymeric materials selected from group (iii). In some embodiments, these blends include one or more additional polymeric materials selected from group (vii). In some embodiments, these blends include one or more additional polymeric materials selected from group (viii).

The additional additives suitable for use in the TPU compositions described herein are not overly limited. Suitable additives include pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, antimicrobials, and any combination thereof.

In some embodiments, the additional component is a flame retardant. Suitable flame retardants are not overly limited and may include a boron phosphate flame retardant, a magnesium oxide, a dipentaerythritol, a polytetrafluoroethylene (PTFE) polymer, or any combination thereof. In some embodiments, this flame retardant may include a boron phosphate flame retardant, a magnesium oxide, a dipentaerythritol, or any combination thereof. A suitable example of a boron phosphate flame retardant is BUDIT 326, commercially available from Budenheim USA, Inc. When present, the flame retardant component may be present in an amount from 0 to 10 weight percent of the overall TPU composition, in other embodiments from 0.5 to 10, or from 1 to 10, or from 0.5 or 1 to 5, or from 0.5 to 3, or even from 1 to 3 weight percent of the overall TPU composition.

The TPU compositions described herein may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment, the preferred stabilizer is Irganox 1010 from BASF and Naugard 445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

In addition, various conventional inorganic flame retardant components may be employed in the TPU composition. Suitable inorganic flame retardants include any of those known to one skilled in the art, such as metal oxides, metal oxide hydrates, metal carbonates, ammonium phosphate, ammonium polyphosphate, calcium carbonate, antimony oxide, clay, mineral clays including talc, kaolin, wollastonite, nanoclay, montmorillonite clay which is often referred to as nano-clay, and mixtures thereof. In one embodiment, the flame retardant package includes talc. The talc in the flame retardant package promotes properties of high limiting oxygen index (LOI). The inorganic flame retardants may be used in the amount from 0 to about 30 weight percent, from about 0.1 weight percent to about 20 weight percent, in another embodiment about 0.5 weight percent to about 15 weight percent of the total weight of the TPU composition.

Still further optional additives may be used in the TPU compositions described herein. The additives include colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof.

All of the additives described above may be used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the TPU composition.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The TPU materials described above may be prepared by a process that includes the step of (I) reacting: a) the polyisocyanate component described above; b) the polyol component described above; and c) the chain extender component described above, where the reaction may be carried out in the presence of a catalyst, resulting in a thermoplastic polyurethane composition.

The process may further include the step of: (II) mixing the TPU composition of step (I) with one or more blend components, including one or more additional TPU materials and/or polymers, including any of those described above.

The process may further include the step of: (II) mixing the TPU composition of step (I) with one or more of the additional additives described above.

The process may further include the step of: (II) mixing the TPU composition of step (I) with one or more blend components, including one or more additional TPU materials and/or polymers, including any of those described above, and/or the step of: (III) mixing the TPU composition of step (I) with one or more of the additional additives described above.

While not wishing to be bound by theory it is believed that any TPU that meets the requirements described herein will be better suited for freeform fabrication, in particular the selective laser sintering, than any TPU that does not. While not wishing to be bound by theory, the necessary parameters are believed to be (i) a melting enthalpy (as measured by DSC) is at least 5.5 J/g (or even at least 10 or at least 15 J/g, and in some embodiments less than 100, 50, 40, or even 20 J/g however it is noted that while not wishing to be bound by theory a higher melting enthalpy is considered to be better for this application and that there may be no real maximum limit for the melting enthalpy but in the event that one would want to limit the melting enthalpy due to practical consideration and/or the properties of readily available materials, the maximum limits provided above could be used in some embodiments); (ii) a Tc (crystallization temperature measured by DSC) of at least than 70° C., (or even greater than 80° C. or greater than 90° C., and in some embodiments less than 150, 140, or even 130° C.); and (iii) a Δ(Tm:Tc), (the difference between the Tm and Tc of the TPU where both are measured by DSC), of between 20 and 75 (or a difference of at least 20, 30, 40, 50, or even 58 degrees and no more than 75, 71, or even 60 degrees). The physical properties of the powder of the TPU are also important and it is believed that the powder should have an average particle diameter of less than 200 microns (or even less than 150 or less than 100 microns). The combination of these parameters is believed to provide TPU well suited for freeform fabrication, in particular selective laser sintering.

In addition, in at least some embodiments, the following parameters are also believed to be important: the resulting thermoplastic polyurethane has (i) a Tm (melting temperature as measured by DSC) of at least 120° C. (or even greater than 130, 140, 170 or 175° C. and in some embodiments less than 200, 190, or even 180° C.), (ii) a weight average molecular weight, Mw, (measured by GPC) of less than 150,000 (or even less than 120,000, or less than 100,000, and in some embodiments more than 30,000, 40,00, 50,000, 60,000, or even more than 70,000), and/or (iii) a Mw/Mn ratio (where Mw is the weight average molecular weight and Mn is the number average molecular weight, where both are measured by GPC) of less than 2.7 (or even less than 2.6, less than 2.5, or less than 2.0, and in some embodiments at least 1.0, more than 1.0, more than 1.5, 1.7, or even more than 1.8).

The Systems and Methods

The solid freeform fabrication systems, in particular the selective laser sintering systems and the methods of using the same useful in the described technology are not overly limited. It is noted that the described technology provides certain thermoplastic polyurethanes that are better suited for solid freeform fabrication systems, in particular selective laser sintering systems, than other thermoplastic polyurethanes, and the key to the described technology is that relative benefit. It is noted that some solid freeform fabrication systems, including some selective laser sintering systems may be better suited for processing certain materials, including thermoplastic polyurethanes, due to their equipment configurations, processing parameters, etc. However, the described technology is not focused on the details of solid freeform fabrication systems, including some selective laser sintering systems, rather the described technology is focused on providing certain thermoplastic polyurethanes that are better suited for solid freeform fabrication systems generally, in particular selective laser sintering systems generally.

Selective laser sintering is an example of a freeform fabrication technology and includes processes practiced in systems available from 3D Systems, Inc., in which articles are produced from a laser-fusible powder in layerwise fashion. In some embodiments selective laser sintering involves using a thin layer of powder which is dispensed and then fused, melted, or sintered, by laser energy that is directed to those portions of the powder corresponding to a cross-section of the article. Conventional selective laser sintering systems, such as the VANGUARD™ system available from 3D Systems, Inc., position the laser beam by way of galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The computer based control system can be programmed with information indicative of the desired boundaries of a plurality of cross sections of the part to be produced. The laser may be scanned across the powder in raster fashion, with modulation of the laser affected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, an additional layer of powder is then dispensed, and the process repeated, with fused portions of later layers fusing to fused portions of previous layers (as appropriate for the article), until the article is complete.

Detailed description of the selective laser sintering technology may be found in U.S. Pat. Nos. 4,863,538, 5,132,143 and 4,944,817, all assigned to Board of Regents, The University of Texas System, and in U.S. Pat. No. 4,247,508, Housholder, all incorporated herein by this reference.

Selective laser sintering technology has enabled the direct manufacture of three-dimensional articles of high resolution and dimensional accuracy from a variety of materials including polystyrene, some nylons, other plastics, and composite materials such as polymer coated metals and ceramics. Polystyrene parts may be used in the generation of tooling by way of the well-known "lost wax" process. In addition, selective laser sintering may be used for the direct fabrication of molds from a CAD database representation of the object to be molded in the fabricated molds; in this case, computer operations will "invert" the CAD database representation of the object to be formed, to directly form the negative molds from the powder. Using the disclosed technology, the described TPU materials may now be successively used in selective laser sintering technology as well.

In some embodiments, laser sintering systems utilize dual piston cartridge feed systems with a counter-rotating roller and an infrared sensor or pyrometer to measure the thermal conditions in the process chamber and the powder bed.

In some embodiments, the thermoplastic polyurethanes used in the described technology are in the form of a powder having the following characteristics: a d50 particle size distribution of between 20 and 100 microns, preferably between 30 and 70 microns, and also satisfying the following equation: (d90−d10)/d50 between 0.85 and 1.2; a sphericity factor of between 0.8 and 1, preferably between 0.85 and 1; and an intraparticle porosity lower than 0.05 ml/g, preferably lower than 0.02 ml/g. As used herein, powder means an assembly of powder particles.

The particle size distribution of the objects may be obtained by laser diffraction measurement on a Malvern granulometer, using a wet module. The quantities used in this document concern d10, d50 and d90. The d10 mesh is the dimension such that 10% of the particles are smaller than this dimension and 90% of the particles are larger than this dimension. The d50 mesh is the dimension such that 50% of the particles are smaller than this dimension and 50% of the particles are larger than this dimension. The d90 mesh is the dimension such that 90% of the particles are smaller than this dimension and 10% of the particles are larger than this dimension.

The sphericity factor may be measured as follows: To quantify the sphericity of the objects, use is made of image analysis in the following manner. The characteristic wavelengths of the small and large diameters for each object are measured on at least 100 objects. For each object, the sphericity factor is defined as the ratio of the small diameter to the large diameter. For a perfect sphere, the ratio is 1. For grains of variable morphology, this ratio is lower than and tends toward 1 when approaching perfect sphericity. On 100 objects sampled, the sphericity factor is calculated from the ratio of the diameters, and the mean sphericity factor is then calculated. To do this, in a manner known per se, the sample of particles is dispersed on a glass slide placed under an optical microscope and the characteristic lengths are recorded in succession.

The intraparticle porosity may be measured as follows: The porous texture of the objects is determined by mercury porosimetry using an AUTOPORE IV™ instrument from Micromeritics. This method is based on the intrusion of mercury into the intergranular and intragranular pore network. This intrusion is managed via a pressure increase. The powder of the invention may have an intraparticle porosity lower than 0.05 ml/g, for pore sizes between 0.01 and 1 microns.

The flowability of the powders may be measured by shearing a sample by the ring shear tester (sold by D. Schulze, Germany). The powders can be pre-sheared on a cell having an area of 81 $cm^2$ with a normal stress equivalent to a mass of 4.3 kg. Powder flowability is a technical concept which is also well known to a person skilled in the art; for further details, reference can be made in particular to the work: "Standard shear testing technique for particulate solids using the Jenike shear cell", published by "The institution of Chemical Engineers", 1989 (ISBN: 0852952325).

The packed density may be measured as follows: powder is poured into a 250 ml glass graduated cylinder, previously weighed. The top of the cylinder is leveled. The weighed cylinder is placed on the volumenometer and the level of the powder bed is read on the graduation of the cylinder after 2048 strokes. The test conforms to the one reported in the text of the European pharmacopoeia, 1997.

The powder of the invention can be obtained in various ways known to a person skilled in the art, according to the materials used. Mention can be made in particular, for example, of the documents EP1797141 and WO2007/115977.

In some embodiments, the materials used in the disclose technology are free of polyamides and related materials, including but not limited to nylon 6, nylon 6-6, nylon 11, nylon 12, nylons 4-6, 6-10, 6-12, 12-12, 6-36; semi-aromatic polyamides, for example, polyphthalamides obtained from terephthalic and/or isophthalic acid, such as the polyamide sold by the trade name AMODEL, and copolymers and alloys thereof.

In some embodiments, the powder may have (i) an intraparticle porosity lower than 0.05 ml/g, or lower than 0.02 ml/g, in particular for pore sizes of 0.01 .mu.m or higher; (ii) a sphericity factor of between 0.8 and 1, 0.85 and 1, or even between 0.9 and 1; (iii) a flowability of between 30 and 60; and/or (iv) an apparent density of between 500 and 700 g/l and a packed density of between 550 and 800 g/l.

Production by selective fusion of layers is a method for producing articles that consists in depositing layers of materials in powder form, selectively melting a portion or a region of a layer, depositing a new layer of powder and again melting a portion of said layer, and continuing in this manner until the desired object is obtained. The selectivity of the portion of the layer to be melted is obtained for example, by using absorbers, inhibitors, masks, or via the input of focused energy, such as a laser or electromagnetic beam, for example. Sintering by the addition of layers is preferred, in particular rapid prototyping by sintering using a laser. Rapid prototyping is a method used to obtain parts of complex shape without tools and without machining, from a three-dimensional image of the article to be produced, by sintering superimposed powder layers using a laser. General information about rapid prototyping by laser sintering is provided in U.S. Pat. No. 6,136,948 and applications WO96/06881 and US20040138363.

Machines for implementing these methods may comprise a construction chamber on a production piston, surrounded on the left and right by two pistons feeding the powder, a laser, and means for spreading the powder, such as a roller. The chamber is generally maintained at constant temperature to avoid deformations.

Other production methods by layer additions' such as those described in WO 01/38061 and EP1015214 are also suitable. These two methods use infrared heating to melt the powder. The selectivity of the molten parts is obtained in the case of the first method by the use of inhibitors, and in the case of the second method by the use of a mask. Another method is described in application DE10311438. In this method, the energy for melting the polymer is supplied by a microwave generator and selectivity is obtained by using a susceptor. The disclosed technology further provides the use of the described thermoplastic polyurethanes in the described systems and methods, and the articles made from the same.

The Articles

The systems and methods described herein may utilize the thermoplastic polyurethanes described herein and produce various objects and/or articles. Objects and/or articles made with the disclosed technology are not overly limited.

In some embodiments, the object and/or article comprises cook and storage ware, furniture, automotive components, toys, sportswear, medical devices, personalized medical articles, replicated medical implants, dental articles, sterilization containers, drapes, gowns, filters, hygiene products, diapers, films, sheets, tubes, pipes, wire jacketing, cable jacketing, agricultural films, geomembranes, sporting equipment, cast film, blown film, profiles, boat and water craft components, crates, containers, packaging, labware, office floor mats, instrumentation sample holders, liquid storage containers, packaging material, medical tubing and valves, a footwear component, a sheet, a tape, a carpet, an adhesive, a wire sheath, a cable, a protective apparel, an automotive part, a coating, a foam laminate, an overmolded article, an automotive skin, an awning, a tarp, a leather article, a roofing construction article, a steering wheel, a powder coating, a powder slush molding, a consumer durable, a grip, a handle, a hose, a hose liner, a pipe, a pipe liner, a caster wheel, a skate wheel, a computer component, a belt, an applique, a footwear component, a conveyor or timing belt, a glove, a fiber, a fabric, or a garment.

Additional articles that may be used in the present invention includes, jewelry, customized keepsakes and/or collectibles, such as but not limited to coins medallions, frames and picture frames, eyewear frames, keys, cups, mugs, miniatures and models, wrist bands, personalized action figures, and the like.

As with all additive manufacturing there is particular value for such technology in making articles as part of rapid prototyping and new product development, as part of making custom and/or one time only parts, or similar applications where mass production of an article in large numbers is not warranted and/or practical.

More generally, the compositions of the invention, including any blends thereof, may be useful in a wide variety of applications, including transparent articles such as cook and storage ware, and in other articles such as automotive components, sterilizable medical devices, fibers, woven fabrics, nonwoven fabrics, oriented films, and other such articles. The compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed from the compositions of the invention including: labware, such as roller bottles for culture growth and media bottles, instrumentation sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, hoses, pipes, and such, including liners and/or jackets thereof. In some embodiments, the articles of the invention are fire hoses that include a liner made from the TPU compositions described herein. In some embodiments the, liner is a layer applied to the inner jacket of the fire hose.

Still further useful applications and articles include: automotive article including air bag covers, interior surfaces of automobiles; biomedical devices including implantable devices, pacemaker leads, artificial hearts, heart valves, stent coverings, artificial tendons, arteries and veins, implants containing pharmaceutically active agents, medical bags, medical tubing, drug delivery devices such as intravaginal rings, and bioabsorbable implants; shoe related articles including an upper and a sole, where the sole may include an insole, a midsole, and an outsole, adhesive systems to connect any of the parts described, other footwear parts including adhesives and fabric coatings, cleats, membranes, gas bladders, gel bladders or fluid bladders, inflated or inflatable inserts, laminated inserts, cushioning devices, soles made with microspheres, heels, wheels embedded in the shoe sole, inflatable tongues, woven and unwoven fabric, odor and moisture absorbent pads, pressurized ankle collars, eyelets and laces, orthotic device or insert, gel pads, resilient pads, barrier membranes and fabrics, and artificial leather; golf ball related articles including 2 piece and 3 piece golf balls, including the cover and the core.

Of particular relevance are personalized medical articles, such as orthotics, implants, bones, dental items, veins, etc that are customized to the patient. For example, bone sections and/or implants may be prepared using the systems and methods described above, for a specific patient where the implants are designed specifically for the patient.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a flame retardant) can migrate to other acidic or anionic sites of other molecules. The products formed thereby, including the products formed upon employing the composition of the technology described herein in its intended use, may not be susceptible of easy description. Nevertheless, all such modifications and reaction products are included within the scope of the technology described herein; the technology described herein encompasses the composition prepared by admixing the components described above.

EXAMPLES

The technology described herein may be better understood with reference to the following non-limiting examples.

Materials.

Several thermoplastic polyurethanes (TPU) as well as several other non-TPU reference materials are evaluated for their suitability of use in selective laser sintering.

Example A is 95A polyether copolymer TPU.
Example B is 94A polyether TPU.
Example C is 91A polyester TPU.
Example D is 52D polyester TPU.
Example E is 90A polycaprolactone TPU.
Example F is 88A aliphatic polyether TPU.
Example G is 94A polyester TPU.
Example H is 90A polyether TPU.
Example I is 93A polycaprolactone copolyester TPU.
Example J is 90A polyether TPU.
Example K is 95A polycaprolactone TPU.

Examples A, B, and C are considered to be inventive examples. Examples D, E, F, G, H, I, J, and K are considered to be comparative TPU examples, where each material fails to meet at least one parameter considered to be needed in order for the TPU to be well suited for selective laser sintering. Each TPU material is tested to determine its suitability for use in selective laser sintering (SLS) processes. The results of this testing are summarized below. All melting temperatures, temperatures of crystallization, and melting enthalpies are measured by DSC. All molecular weight values are measured by GPC.

TABLE 1

Summary of TPU Properties related to SLS processing

|  | Tm (° C.) | Tc (° C.) | Δ(Tm:Tc) (° C.) | ΔHm (J/g) | Mw | Mn | Mw/Mn |
|---|---|---|---|---|---|---|---|
| Ex A | 179 | 120 | 59 | 15.4 | 96,902 | 53,243 | 1.82 |
| Ex B | 142 | 83 | 59 | 37.8 | 109,760 | 50,119 | 2.19 |
| Ex C | 174 | 99 | 75 | 5.7 | 135,700 | 51,208 | 2.65 |
| Ex D | 60 | 40 | 20 | 90.4 | 119,631 | 53,407 | 2.24 |
| Ex E | 119 | 54 | 65 | 27 | 321,241 | 142,142 | 2.26 |
| Ex F | 105 | 47 | 58 | 20.5 | 158,127 | 58,566 | 2.7 |
| Ex G | 155 | 72 | 83 | 7.8 | 625,21 | 31,105 | 2.01 |
| Ex H | 188 | 115 | 73 | 5.1 | 110,500 | 51,878 | 2.13 |
| Ex I | 177 | 114 | 63 | 4.3 | 132,747 | 62,031 | 2.14 |
| Ex J | 179 | 88 | 91 | 14.4 | 203,700 | 87,425 | 2.33 |
| Ex K | 164 | 85 | 79 | 12.3 | 289,800 | 89,444 | 3.24 |

Based on these results, TPU Examples A, B, and C are suitable TPU for laser sintering processing and would be expected to process well. These materials were further tested in a selective laser sintering process to verify the specified parameters are necessary for TPU materials to be suitable for, and more likely to process well in, selective laser sintering processes.

The selected materials are tested on a 3D Systems SINTERSTATION VANGUARD™ machine with the HiQ upgrade. All tests are conducted in a nitrogen atmosphere. Since a commercial material profile must be entered to set the machine parameter defaults, the library values for Duraform (nylon) EX were selected. Changes from this default setting are noted below. Each example is tested in the form of a powder. Generally, the powder was either coarse, granular and/or sandy, or in contrast fine, clumpy, and/or floury and samples were sifted prior to testing. It is noted below where the properties of powder are believed to have an impact on the processing.

Example A

For Example A the powder tested was fine and clumpy. The powder was sieved in the 70 mesh sieve. It was loaded into the chamber and all bins were heated to 110° C. The powder spread well, so the part bin temperature was increased to 150° C. and then 160° C. Powder spreading was still acceptable. The part bin/feed bin temperatures were increased to the following values while assuring that the powder continued to spread well: 170° C./120° C., then 175° C./130° C., and then 178° C./140° C. The maximum temperature for the feed bins is 140° C. As the reported melt point was 179° C. (Table 1), the temperature was not increased further. The powder was still spreading reasonably well, but some clumping appeared at this high temperature. The six tension coupon run was begun with three pairs of samples at 35, 45 and 55 watts power. Initially, the part layer thickness was 0.005 in, and the feed layer thickness was 0.020 in. As the run progressed, the powder was behaving well, so the part layer thickness was decreased to 0.004 in, and the feed layer thickness was eventually set at 0.018 in. The part built successfully, although some powder clumping was observed during spreading. Approximately 0.1 in of powder was fed to the part bin, and a second set of tension coupons was built. Since the powder seemed to be running well overall, three random small parts were added to the tension coupon build. There was some undesirable clumping observed, so the part bin temperature was lowered to 170° C., and the feed bin temperature was lowered to 135° C. After 4-5 layers, powder clumping was still occurring to some degree, so the feed bin temperature was lowered to 125° C. After a few layers, the part bin and feed bin temperatures were reduced to 160° C. and 120° C., respectively. This corrected the powder clumping issue. After about ten layers, the part bin and feed bin temperatures were set at 165° C. and 122° C., respectively. The tension coupons were built at 20, 25 and 30 watts. The part power setting was 30 watts.

Example A was the best performing of the lots tested. The surface features were sharp. There was some post-build curling, but this is usually attributed to pulling the parts from the sinter station before they have adequately cooled. Overall Example A is considered highly suitable for selective laser sintering.

Example B

For Example B the feed and part bins were heated to 80° C., which was about 5° C. below the reported crystallization temperature (Table 1). The powder spread well, so the temperature was increased in increments on all bins until 120° C. was reached. The part bin temperature was slowly increased to 140° C. which was just below the reported melting point. A set of six ASTM D638 tension coupons were successfully run, two each at scanning powers of 35, 45, and 55 watts and uniform outline power of 5 watts. A second set of six tension coupons were successfully run with the same scanning parameters but with an outline power of 10 watts. Finally, a third set of six tension coupons were run with 25, 28 and 30 watts scanning power and 10 watts outline power. The build was terminated, and the chamber was allowed to cool prior to removing the specimens. The part cake was very stiff but removable. It had the look and feel of angel-food cake. Some smoking occurred at higher powers (45-55 watts), but it did not cause particular concern. The top surface of the tension coupons run from Example B was cupped. That is, the cross section of the tension coupons, instead of being rectangular, had a cross section with a convex appearance on the top surface. The maximum thickness was approximately 0.17 in, while the minimum centerline thickness was 0.14 in.

Example B was promising with good processing and good surface finish, though the parts did show cupping. Overall Example B is considered very suitable for selective laser sintering.

Example C

For Example C the powder tested was coarse and granular. It was loaded into the chamber and all bins were heated to 85° C. The powder spread well so the temperature was increased in 5° C. increments to 140° C. Some "gouging" on the powder feed side was observed occasionally after 100° C. This is the maximum temperature for the feed bins. The part bin temperature was increased in 5° C. increments to 170° C. It was then heated to 172° C., 174° C., 175° C. and finally 176° C. As the reported melt point was 174° C. (Table 1), the temperature was not increased further. In an effort to insure that the part bin was not overly caking, the part bin was raised 0.1 in to expose the deposited powder, and the roller was run across the bins. The large amount of part cake behaved like powder, not a part, so it was concluded that part caking was not excessive. A build of six ASTM D638 tension coupons was initiated, but the parts dragged after 3-5 layers due to curling. The part bin layer thickness was increased from the default value of 0.004 in to 0.005 in. On the second layer, the part surface started to pull powder as an initial start to dragging, so this part build was stopped. The part bin was dropped 0.1 in and was refilled with loose powder from the feed bins to get a fresh start. The part bin temperature was increased to 180° C. (feed bins still at 140° C.). The tension coupon run was initiated, and the parts seemed to build acceptably at the outset. After about 12 layers, short feeding was observed. The feed layer thickness was increased from the default 0.015 in to 0.020 in. The six tension coupons were successfully completed, two each at scanning powers of 35, 45, and 55 watts and uniform outline power of 5 watts. The part bin was lowered approximately 0.25 in, and powder was fed from the feed bins to re-level the part bin. The part bin temperature was increased to 185° C. with the feed bin temperature at 140° C., the part bin layer thickness at 0.005 in and the feed bin layer thickness at 0.015 in. Powder clumping was aggravated at the higher temperature due to powder caking. The powder started short feeding on Layer 2, so the feed bin layer thickness was increased to 0.020 in. The six tension coupons were successfully completed, two each at scanning powers of 35, 45, and 55 watts and uniform outline power of 5 watts. The part cake was very stiff but removable for the first run of tension coupons with the part bin temperature set at 180° C. For analysis of the part cake, one of the two 55 watt test coupons was not finished (or tested), so the adherent part cake is present. The six tension coupons run at 185° C. were effectively completely fused to the part cake and were not salvageable. Some smoking occurred at higher powers (45-55 watts), but it did not cause particular concern.

Example C was runnable and produced parts that were separable from the part cake at a part bin temperature of 180° C., though surface finish was poor. Overall Example C is considered suitable for selective laser sintering.

Molecular weight distributions can be measured on the Waters gel permeation chromatograph (GPC) equipped with Waters Model 515 Pump, Waters Model 717 autosampler and Waters Model 2414 refractive index detector held at 40° C. The GPC conditions may be a temperature of 40° C., a column set of Phenogel Guard+2× mixed D (5u), 300×7.5 mm, a mobile phase of tetrahydrofuran (THF) stabilized with 250 ppm butylated hydroxytoluene, a flow rate of 1.0 ml/min, an injection volume of 50 µl, sample concentration ~0.12%, and data acquisition using Waters EMPOWER PRO™ software. Typically a small amount, typically approximately 0.05 gram of polymer, is dissolved in 20 ml of stabilized HPLC-grade THF, filtered through a 0.45-micron polytetrafluoroethylene disposable filter (Whatman), and injected into the GPC. The molecular weight calibration curve may be established with EASICAL® polystyrene standards from Polymer Laboratories.

DSC measurement may be conducted using a Differential Scanning Calorimeter (TA Instruments Q2000 DSC with RCS 90 cooling system). The Q2000 DSC may be calibrated using the "Heat Flow T4 (mW)" option from the Calibration Wizard on the TA Instrument software. It uses an empty cell for the first run, sapphire (clear for the sample side and red for the reference side) for the second run, then an Indium standard for the third run. The Cp calibration is done using a sapphire in a Tzero™ aluminum pan with lid. The Total and Reversing constants are typically set to 1.000 and tested over the temperature range of interest. Cp K-values are then calculated and used. This covers both standard mode and modulation mode for the Q2000 DSC. The DSC is calibrated for the temperature range of interest from −90° C. to 350° C.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the technology described herein can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration. That is "consisting essentially of" permits the inclusion of substances that do not materially affect the basic and novel characteristics of the composition under consideration.

While certain representative embodiments and details have been shown for the purpose of illustrating the subject technology described herein, it will be apparent to those skilled in this art that various changes and modifications can be made therein without departing from the scope of the subject invention. In this regard, the scope of the technology described herein is to be limited only by the following claims.

What is claimed is:

1. A method of fabricating a three-dimensional object, comprising the step of: (I)
    operating a system for producing a three-dimensional object from a powder;
       wherein said system comprises a solid freeform fabrication apparatus that selectively fuses layers of powder; so as to form the three-dimensional object;
       wherein said powder comprises a thermoplastic polyurethane derived from (a) a polyisocyanate component, (b) a polyol component, and (c) an optional chain extender component wherein the thermoplastic polyurethane has a weight average molecular weight measured by GPC of less than 150,000;
       wherein said powder has an average particle diameter of less than 150 microns;
       wherein the resulting thermoplastic polyurethane has a melting enthalpy of at least 10 J/g;
       wherein the resulting thermoplastic polyurethane has a Tc of at least 90° C.;
       wherein the resulting thermoplastic polyurethane has a Tm measured by DSC of greater than 170° C.; and
       wherein the resulting thermoplastic polyurethane has a Δ(Tm:Tc) of between 58° C. and 71° C.

2. The method of claim 1, wherein the solid freeform fabrication apparatus comprises: (a) a chamber having a target area at which an additive process is performed; (b) means for depositing and leveling a layer of powder on said target area; and (c) means for fusing selected portions of a layer of the powder at said target area.

3. The method of claim 1, wherein said solid freeform fabrication apparatus comprises a selective laser sintering apparatus.

4. The method of claim 1, wherein the polyisocyanate component comprises an aromatic diisocyanate.

5. The method of claim 1, wherein the polyisocyanate component comprises 4,4"-methylenebis(phenyl isocyanate).

6. The method of claim 1, wherein the polyol component comprises a polyether polyol, a polyester polyol, a copolymer of polyether and polyester polyols, or a combination thereof.

7. The method of claim 1, wherein the polyol component comprises poly(tetramethylene ether glycol), polycaprolactone, a polyester adipate, a copolymer thereof, or a combination thereof.

8. The method of claim 1, wherein the chain extender component comprises a linear alkylene diol.

9. The method of claim 1, wherein the chain extender component comprises 1,4-butanediol, 1,12-dodecanediol, dipropylene glycol, or a combination thereof.

10. The method of claim 1, wherein the thermoplastic polyurethane further comprises one or more colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents, or any combinations thereof.

11. The method of claim 1 wherein said three dimensional object comprises cook and storage ware, furniture, automotive components, toys, sportswear, medical devices, personalized medical articles, replicated medical implants, dental articles, sterilization containers, drapes, gowns, filters, hygiene products, diapers, films, sheets, tubes, pipes, wire jacketing, cable jacketing, agricultural films, geomembranes, sporting equipment, cast film, blown film, profiles, boat and water craft components, crates, containers, packaging, labware, office floor mats, instrumentation sample holders, liquid storage containers, packaging material, medical tubing and valves, a footwear component, a sheet, a tape, a carpet, an adhesive, a wire sheath, a cable, a protective apparel, an automotive part, a coating, a foam laminate, an overmolded article, an automotive skin, an awning, a tarp, a leather article, a roofing construction article, a steering wheel, a powder coating, a powder slush molding, a consumer durable, a grip, a handle, a hose, a hose liner, a pipe, a pipe liner, a caster wheel, a skate wheel, a computer component, a belt, an applique, a footwear component, a conveyor or timing belt, a glove, a fiber, a fabric, or a garment.

* * * * *